(12) United States Patent
Tom et al.

(10) Patent No.: US 7,578,702 B1
(45) Date of Patent: Aug. 25, 2009

(54) BATTERY CELL INTERCONNECT SYSTEM

(75) Inventors: Kwok Tom, Madison Heights, MI (US); William Koetting, Davisburg, MI (US); Kelly Kebl, Berkley, MI (US)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/165,286

(22) Filed: Jun. 30, 2008

(51) Int. Cl.
 *H01R 33/00* (2006.01)
(52) U.S. Cl. .................................... 439/627
(58) Field of Classification Search ................ 439/627, 439/99, 507; 429/123, 158, 159, 160
See application file for complete search history.

(56) References Cited

U.S. PATENT DOCUMENTS 7,229,327 B2 * 6/2007 Zhao et al. .................. 439/840
7,270,576 B2 * 9/2007 Kim et al. .................... 439/627
7,294,020 B2 * 11/2007 Zhao et al. .................. 439/627

* cited by examiner

*Primary Examiner*—Phuong K Dinh
(74) *Attorney, Agent, or Firm*—Cantor Colburn LLP

(57) ABSTRACT

A flexible and adaptable battery cell interconnection system is provided for interconnecting a plurality of battery cells. The battery cell interconnect system, includes a conductive interconnect having a first termination end and second termination end, the first termination end offset from the second termination end and separated therefrom by an intermediate portion, a pair of spaced threaded rods disposed on each of the first termination end and the second termination end, and an insulating sleeve disposed on an outer surface of the conductive interconnect over the intermediate portion. The system also includes a pair of V-shaped conductive terminal clamps, operative for disposition on respective ones of the spaced rods through respective ones of the spaced bores and a plurality of threaded nuts operative for disposition on each of the threaded rods, wherein the terminal clamps are operative for clamping a plurality of battery cell electrodes.

20 Claims, 4 Drawing Sheets

BATTERY CELL INTERCONNECT SYSTEM

TECHNICAL FIELD

This invention relates generally to batteries, and, more particularly, to an interconnect system for interconnecting a plurality of battery cells.

BACKGROUND OF THE INVENTION

Vehicles using fossil fuel, such as gasoline and diesel oil, create exhaust gases which generally include various pollutants. A technology of using storage or secondary batteries, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional combustion engine, have been developed, and some are now being used commercially. Various nickel-metal hydride (NIMH) secondary batteries have been widely used as the power source in EV and HEV applications. More recently, however, the use of lithium-ion, particularly lithium-polymer, secondary batteries has been proposed.

High output and large capacity are needed for such secondary batteries to be used as the power source. For this reason, such batteries are typically constructed from a plurality of smaller battery cells (unit cells) that are interconnected in series or in parallel with each other to form a battery module. A plurality of battery modules is interconnected to obtain a battery pack having the desired output and capacity characteristics.

In order to use battery packs of the type described above in various applications, including applications where the devices which are in power communication with the battery pack are subject to movement, such as, for example, various motorized vehicles, aircraft, watercraft, trains and the like, it is generally desirable to establish durable battery cell interconnects which may be used to electrically interconnect a plurality of cells within an individual battery module, or between battery modules, or both, and to provide electrical interconnects between modules to form the battery pack. Durable battery cell interconnects must provide suitable electrical interconnections and electrical contacts in the manufacturing and operational environments, which can include various forces and moments associated with installation or movement of the vehicle or craft, as well as temperature extremes and atmospheric contaminants that can induce various forms of corrosion and other degradation processes. While some interconnects for interconnecting individual battery cells have been proposed, the nature of the battery cell electrodes, such as their size, shape, spacing, electrode materials, material characteristics and the like, as well the nature of the battery cells, such as their size, shape, cell spacing, intra-cell and inter-cell electrode spacing and the like, is constantly and rapidly changing as new battery cell configurations and materials are developed. Therefore, it is desirable to develop interconnects for battery cells that may be used in battery modules and battery packs of the types described above.

SUMMARY OF THE INVENTION

In general terms, this invention provides a battery cell interconnection system that is flexible and adaptable to interconnect a plurality of battery cells. The battery cell interconnection system of the invention is scalable and may be configured to address constantly and rapidly changing battery cell configurations and materials, which may alter the nature of the battery cell electrodes, such as their size, shape, spacing, electrode materials, material characteristics and the like, as well the nature of the battery cells, such as their size, shape, cell spacing, intra-cell and inter-cell electrode spacing and the like. The interconnect system may be used to interconnect a plurality of battery cells, where the number of the plurality of cells may vary.

An exemplary embodiment of the battery cell interconnect system, includes a conductive interconnect having a first termination end and second termination end, the first termination end offset from the second termination end and separated therefrom by an intermediate portion, a pair of spaced threaded rods disposed on each of the first termination end and the second termination end, and an insulating sleeve disposed on an outer surface of the conductive interconnect over the intermediate portion. The system also includes a pair of V-shaped conductive terminal clamps, each terminal clamp having a pair of intersecting legs, each having a contact surface thereon, and a pair of spaced bores disposed at an intersection of the legs, each V-shaped terminal clamp operative for disposition on respective ones of the spaced rods through respective ones of the spaced bores. The system also includes a plurality of threaded nuts operative for disposition on each of the threaded rods, wherein the terminal clamps are operative for clamping a plurality of battery cell electrodes by pressing engagement of the contact surfaces against the outer surface of the conductive interconnect.

The interconnect system may provide that the conductive interconnect has an s-shape.

The interconnect system may also provide that the conductive interconnect includes aluminum or copper.

The interconnect system may further provide that the V-shaped terminal clamps include aluminum or copper.

The interconnect system may also be configured with each of the V-shaped terminal clamps having a flat at an apex of the intersecting legs which encompasses the spaced bores.

The interconnect system may also provide that the conductive interconnect is substantially cylindrical.

The interconnect system may also be configured such that the first termination end and second termination end each have a flat, wherein the respective pairs of threaded rods are disposed on the flats and extend through the conductive interconnect.

The interconnect system may also be configured such that the offset separates the first termination end by an offset distance, and the conductive interconnect has a length, wherein the length is greater than the offset difference. The interconnect system may also be configured such that the ratio of the length to the offset distance is greater than 2.

Another exemplary embodiment of the battery cell interconnect system, includes a conductive interconnect having a first termination end and second termination end, the first termination end offset from the second termination end and separated therefrom by an intermediate portion, a first pair of spaced threaded rods disposed on the first termination end and a second pair of spaced threaded rods disposed on the second termination end, and an insulating sleeve disposed on an outer surface of the conductive interconnect over the intermediate portion. The system also includes a first V-shaped conductive terminal clamp and a second V-shaped conductive terminal clamp, each of the terminal clamps having a pair of intersecting legs, each having a contact surface thereon, and a pair of spaced bores disposed at an intersection of the legs, the first terminal clamp disposed on the first pair of spaced rods at the first termination end through its spaced bore pair, and the second terminal clamp disposed on the second pair of spaced rods at the second termination end through its spaced bore pair. The system also includes a plurality of threaded nuts, each disposed on one of the threaded rods. The system also includes a plurality of battery cells, each having a first conductive electrode, a second conductive electrode, and an electrode spacing between them, the battery cells in touching contact with the first electrodes substantially axially aligned with one another and the second electrodes substantially axially aligned with one another, a first half of the plurality of battery cells having their first electrodes clamped between the contact surface of the first terminal clamp and the first terminal end to form a first electrical contact therebetween, and a second half of the plurality of battery cells having their second electrodes clamped between the contact surface of the second terminal clamp and the second terminal end to form a second electrical contact therebetween.

These and other features and advantages of this invention will become more apparent to those skilled in the art from the detailed description of a preferred embodiment. The drawings that accompany the detailed description are described below.

BRIEF DESCRIPTION OF THE DRAWINGS

The following is a brief description of the drawings wherein like elements are numbered alike in the several views.

DETAILED DESCRIPTION OF AN EXEMPLARY EMBODIMENT

This invention provides a battery cell interconnection system that is flexible and adaptable to interconnect a plurality of battery cells. The battery cell interconnection system of the invention is scalable and may be configured to address constantly and rapidly changing battery cell configurations and materials, which may alter the nature of the battery cell electrodes, such as their size, shape, spacing, electrode materials, material characteristics and the like, as well the nature of the battery cells, such as their size, shape, cell spacing, intra-cell and inter-cell electrode spacing and the like. The interconnect system may be used to interconnect a plurality of battery cells, where the number of the plurality of cells may vary from a relatively small number of cells, to a number sufficient to form a battery module (e.g., 6-20), to a number that encompasses a plurality of battery modules, and including a number sufficient to form a battery pack.

Figure 3:
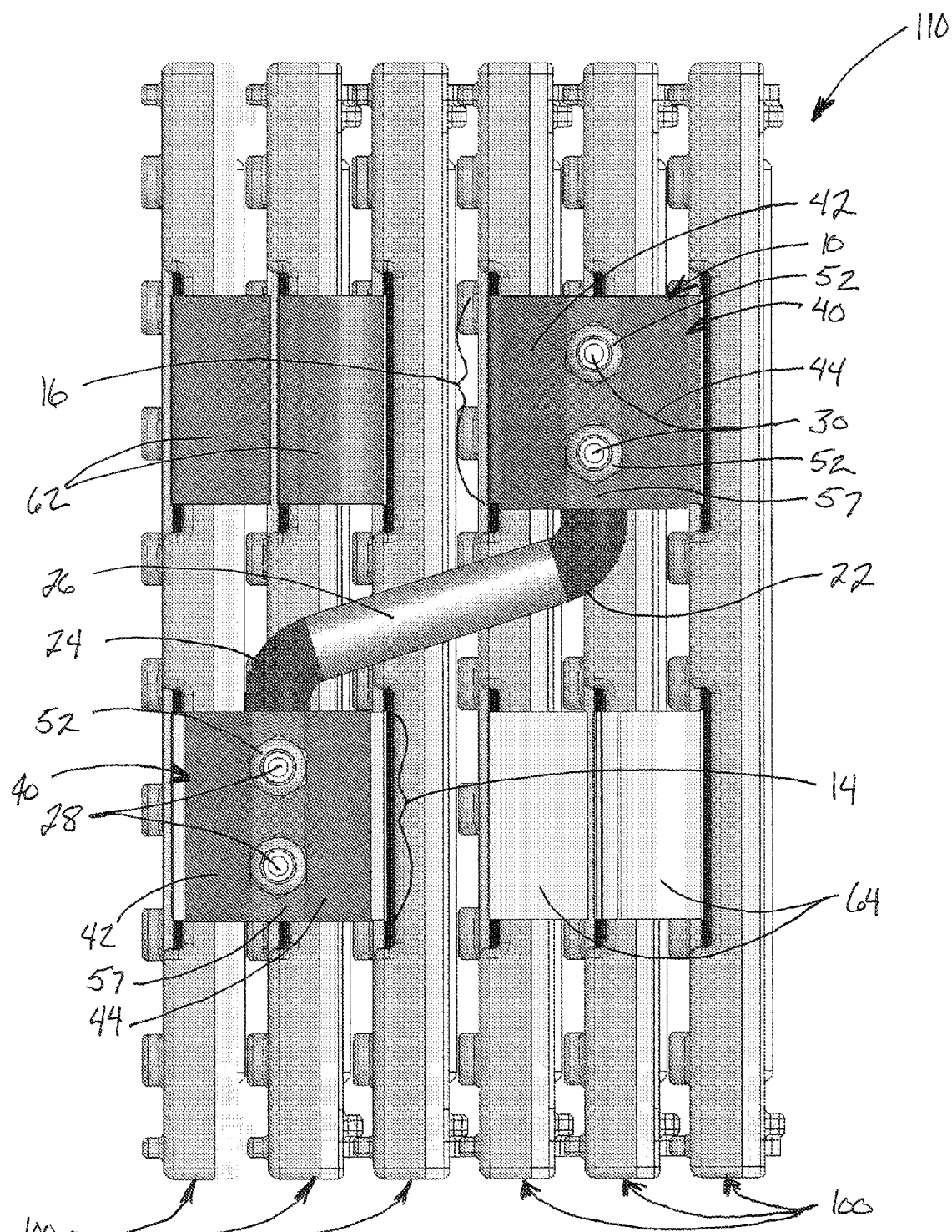
FIG. 3 is top view of an exemplary embodiment of a battery cell interconnect system of the invention.
Figure 4:
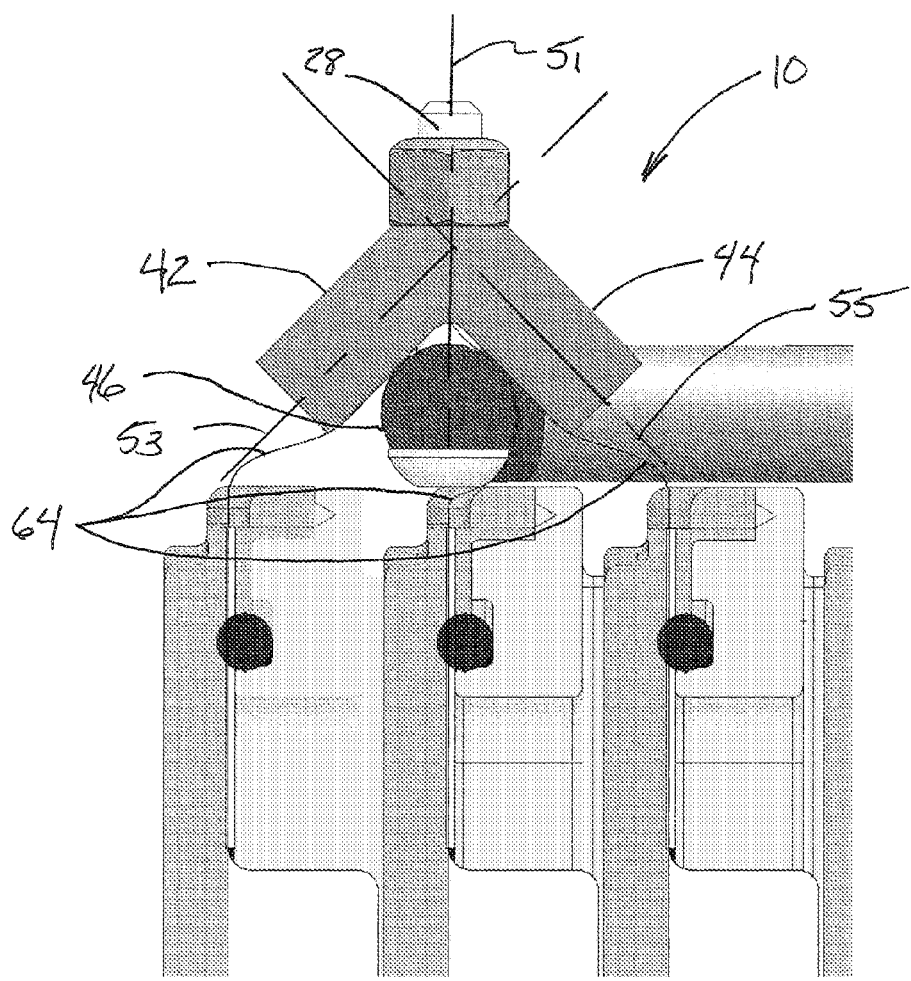
FIG. 4 is a partial front view of the battery cell interconnect system of FIG. 3.
Figure 5:
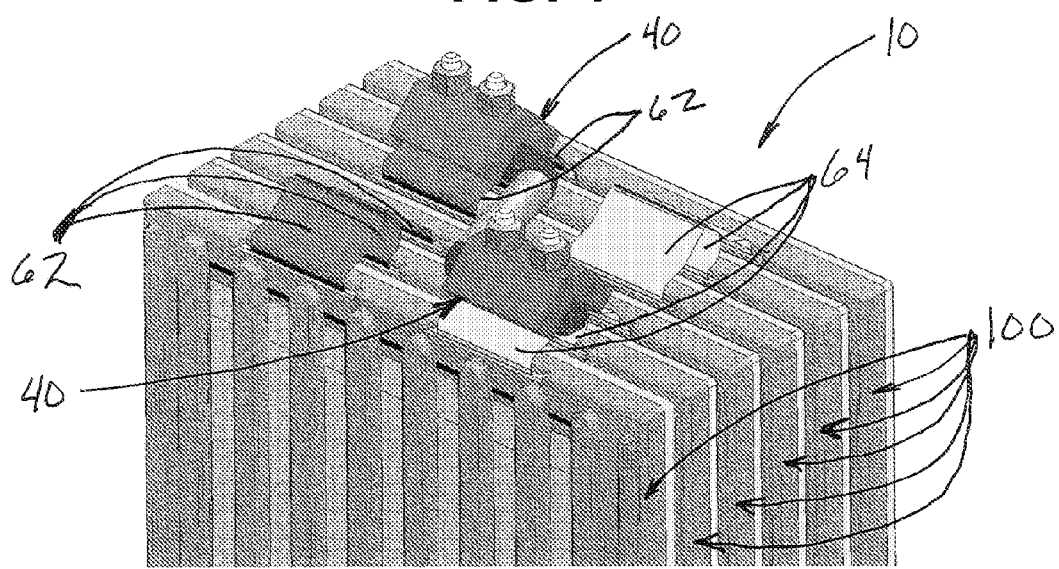
FIG. 5 is a partial perspective view of the battery cell interconnect system of FIG. 3.
Figure 6:
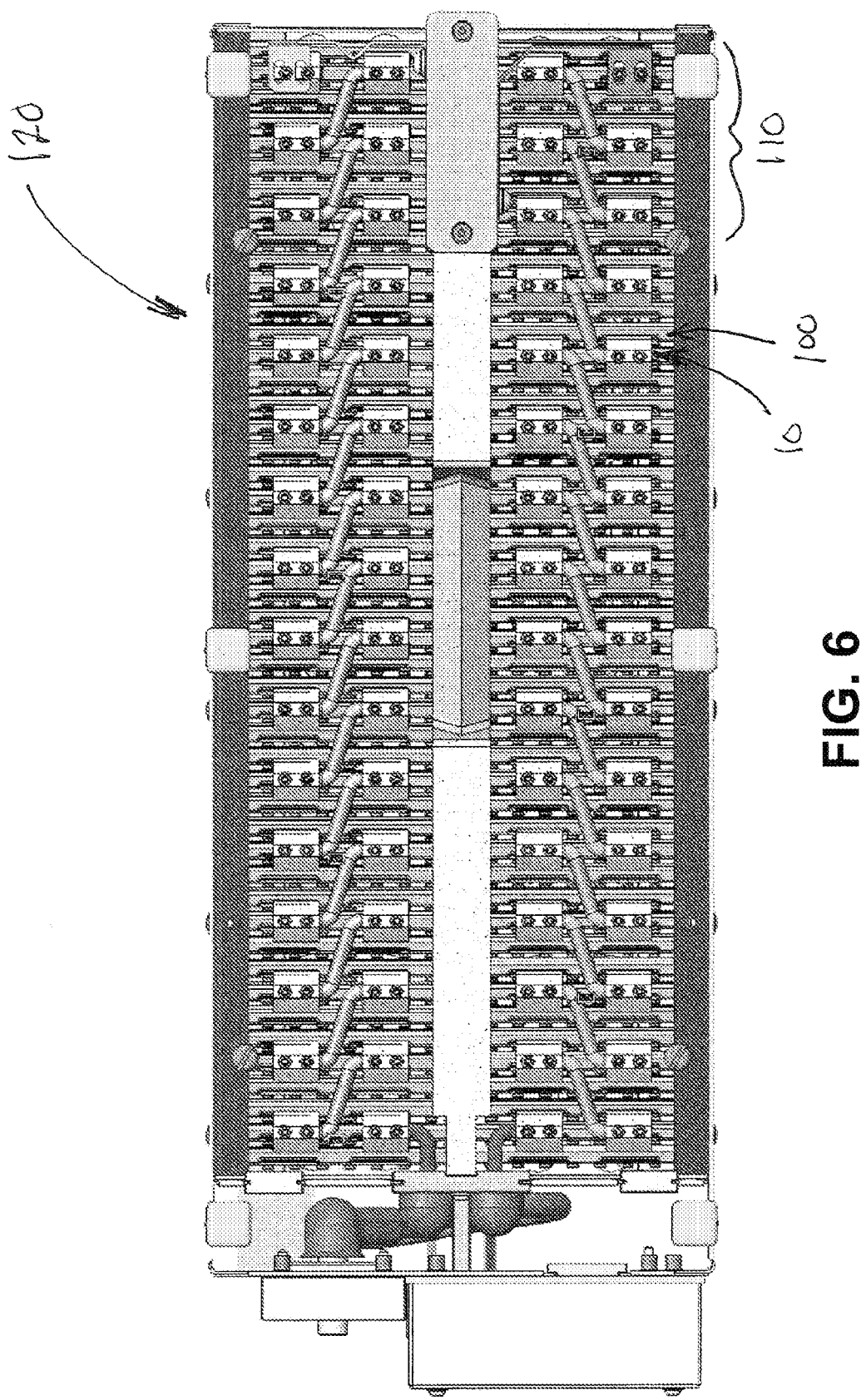
FIG. 6 is a top view of another exemplary embodiment of a battery cell interconnect system of the invention.

Referring to FIGS. 1-5, an exemplary embodiment of a battery cell interconnect system 10 for electrically interconnecting a plurality of battery cells 100 is disclosed, as well as the components incorporated therein. Referring to FIGS. 3 and 5, the number of battery cells 100 interconnected by battery cell interconnection system 10 may be sufficient to constitute a battery module 110. Referring to FIG. 6, battery cell interconnect system 10 may also be utilized to interconnect a plurality of battery pack modules 110 to form a battery pack 120.

Battery cell interconnect system 10 includes a conductive interconnect 12. Conductive interconnect 12 may be made from any suitable electrically conductive material having sufficient conductivity to transmit electric power to and from the cells to devices with which it is in power communication. Conductive interconnect 12 may be made, for example, from a material having high electrical conductivity, such as pure aluminum or various aluminum alloys, or pure copper or various copper alloys, or combinations thereof. Increasing the conductivity, or lowering the resistivity, reduces the resistive heating of the conductive interconnect 12, as well as associated components of the system, including the battery cells. Conductive interconnect 12 may have any suitable shape or cross-sectional profile, such as a substantially cylindrical or substantially rectangular shape. In an exemplary embodiment, conductive interconnect 12 was made from a 6061 T6 aluminum alloy cylindrical rod having a diameter of about 7.94 mm. Pure aluminum and aluminum alloys, as well as pure copper and copper alloys are readily available in a variety of rod and bar forms having the shapes described herein.

Figure 1:
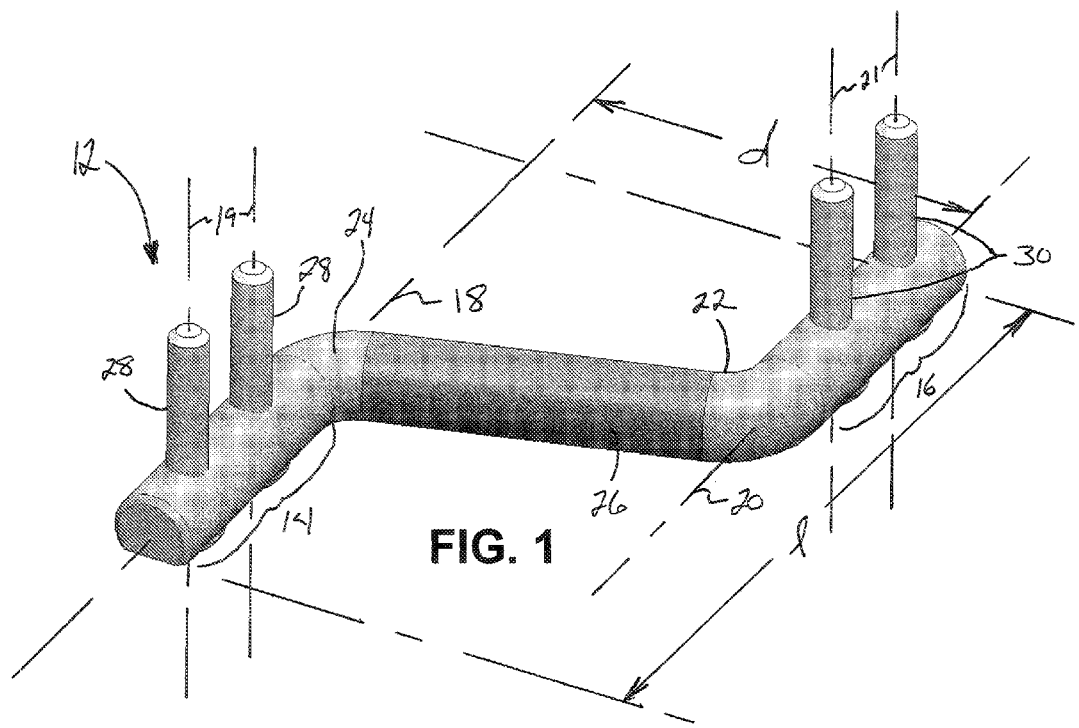
FIG. 1 is a perspective view of an interconnect in accordance with an exemplary embodiment of the invention.
Figure 2:
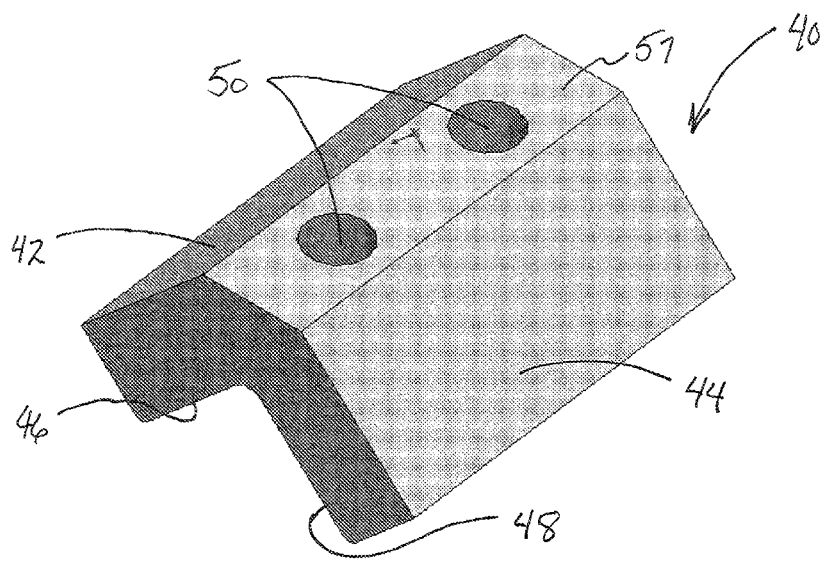
FIG. 2 is a perspective view of a V-shaped terminal clamp in accordance with an exemplary embodiment of the invention.

Conductive interconnect 12 has a first termination end 14 and a second termination end 16. These ends are used to make the electrical connections or terminations to the cell electrodes. First termination end 14 and second termination end 16 may have any suitable lengths, and these lengths may be different for the respective ends. Their lengths will generally be selected to accommodate the width of the cell electrodes. First termination end 14 and second termination end 16 are offset from one another with regard to their respective longitudinal axes 18 and 20 by an offset distance (d). In an exemplary embodiment, offset distance (d) was about 30.75 mm. However, the offset distance (d) may be any suitable distance, and may be varied in conjunction with the thickness of the cells and the inter-cell electrode spacing (the spacing between electrodes of similar polarity in different cells), the length of the cell electrodes and other factors. Conductive interconnect 12 also has an overall length (l), as shown in FIGS. 1 and 3 between the respective ends. In an exemplary embodiment, the length (l) was about 80 mm. However, the overall length (l) may be any suitable length, and may be varied in conjunction with intra-cell electrode spacing (the spacing of the electrodes of opposite polarity within a given cell) and other factors. This combination of length (l) and offset distance (d) provided a ratio (l/d) of greater than 2.

First termination end 14 and second termination end 16 are separated from one another by an intermediate portion 22 extending therebetween. The outer surface 24 of conductive interconnect 12 in intermediate portion 22 is covered by electrically insulating layer 26. Insulating layer 26 may include an insulating sleeve 26 which is slip fit over intermediate portion 22, or may be deposited onto intermediate portion 22 by any insulating layer deposition means. Insulating layer 26 may include any suitable electrically insulating material, such as various electrically insulating engineering plastics, including those which may be applied as a shrink-wrap tube or sleeve, such that they may be slip fit over the outer surface 24 to the intermediate portion 22, and then heated to cause the tube to shrink, thereby forming a tightly conforming insulating layer 26 over intermediate portion. Insulating layer 26 is used to prevent accidental arcing, discharge or contact between conductive interconnect 12 and the cell electrodes of adjacent cells which are not directly connected to conductive interconnect 12. Insulating layer 26 may be disposed on outer surface 24 of intermediate portion 22 in any suitable manner.

Referring to FIGS. 1-6, a pair of spaced threaded rods 26,28 is disposed on each of the first termination end 14 and the second termination end 16. Threaded rods 26 are located on first termination end 14 and threaded rods 28 are located on second termination end 16. Rods 26,28 extend generally orthogonally with reference to respective longitudinal axes 18 and 20, and generally have their own respective longitudinal axes 19, 21 that may be aligned to intersect longitudinal axes 18,20. Threaded rods may be disposed in the manner described by being threaded into a suitably positioned pair of threaded bores which extend through conductive interconnect 12 on first termination end 14 and second termination end 16. However, threaded rods may be otherwise disposed by any suitable attachment means or method. Threaded rods are spaced apart a sufficient distance to enable the cell electrodes to be received therein. Generally, the spacing between the respective ones of a given pair will be greater than or equal to the width of the cell electrodes. The extending length and diameter of the rods, thread pitch and their material and material characteristics will be selected in consideration of the diameter of conductive interconnect 12 and with regard to the torque requirements associated with attachment of the other components described herein and their sizes. In an exemplary embodiment, the threaded rods were headed stainless steel machine screws.

Referring now to FIGS. 2-5, battery cell interconnect system 10 also includes a first V-shaped conductive terminal clamp 40 and a second V-shaped conductive terminal clamp 40. The same reference numerals are used for each because it is generally preferred that they be the same for the purpose of part standardization and cost considerations; however, this is not required and the first V-shaped conductive terminal clamp 40 and the second V-shaped conductive terminal clamp 40 may be different from on another, such as by having different sizes, or by being made from different materials, or by having different outer finishes or markings. Each V-shaped conductive terminal clamp 40 has a pair of intersecting legs 42,44. Each of legs 42,44 has respective electrical contact surfaces 46,48 on respective opposed inner faces thereof. Each clamp 40 also has a respective a pair of spaced bores 50 disposed at an intersection of the legs along a corner formed by their intersection. More particularly, the bores 50 may be centered along a plane 51 that bisects mid-planes 53,55 extending through legs 42,44, as shown in FIG. 4. Each of the V-shaped terminal clamps may also include a flat 57 at an apex of the intersecting legs that encompasses the spaced bores. Flat 57 shown extends the entire length of the clamps and provides a bearing, seating surface for the base of fasteners used to apply clamping pressure to the clamps 40, such as threaded nuts 52. The first terminal clamp 40 is operative for disposition, and upon installation is disposed on, the first pair of spaced rods 28 at the first termination end 14 through its spaced bore pair 50. Likewise, the second terminal clamp 40 is operative for disposition, and upon installation is disposed on, the second pair of spaced rods 30 at the second termination end 16 through its spaced bore pair 50.

First V-shaped conductive terminal clamp 40 and a second V-shaped conductive terminal clamp 40 may also be made from any suitable electrically conductive material having sufficient conductivity to transmit electric power to and from the cells to devices with which it is in power communication. Clamps 40 may be made, for example, from a material having high electrical conductivity, such as pure aluminum or various aluminum alloys, or pure copper or various copper alloys, or combinations thereof. Increasing the conductivity, or lowering the resistivity, reduces the resistive heating of the clamps 40, as well as associated components of the system, including the battery cells. Clamps 40 may have any suitable size. In an exemplary embodiment, clamps 40 were made from a 6061 T6 aluminum alloy formed bar stock having the V-shape illustrated herein without the flat. The flat 57 was machined to the shape shown in FIG. 2. The thickness of the legs 42,44 was about 3.175 mm, the width of the legs was about 12.7 mm, and the overall length of the clamps 40 was about 20.32 mm. Pure aluminum and aluminum alloys, as well as pure copper and copper alloys are readily available in a variety of rod and bar forms having the shapes described herein. Preparation for both conductive interconnects 12 and clamps 40 should include thorough cleaning and degreasing to remove potentially non-conductive materials, particularly from the contact surfaces 46,48 and termination ends 14,16.

Referring to FIGS. 3-6, the battery cells 100 described herein may be any suitable rechargeable battery cells. In an exemplary embodiment, the battery cells were lithium-polymer (LiPo) battery cells, but the battery cell interconnect system 10 may be used with other types of battery cells 100 also. Each of battery cells 100 had a length of about 186.50 mm, a width of about 103.25 mm and a thickness of about 7.20 mm. The battery cells 100 are placed in touching contact, and are preferably mechanically interlocked and fixed to one another through a series of interconnecting members to maintain a network of connected cells, such as the six cells shown in FIGS. 3 and 5, which may also comprise a battery module 110. Battery cells 100 each have two cell electrodes, one having a negative polarity and one having a positive polarity. In an exemplary embodiment, the cell electrodes included metal tapes having thickness of about 0.20 mm and a width of about 20 mm. The electrodes having positive polarity (cathodes) included anodized aluminum. The electrodes having negative polarity (anodes) included nickel-plated copper. In the arrangement shown, battery cells 100 are arranged with all of the first electrodes 64 of one polarity (e.g., positive or +) being axially aligned and all of the second electrodes 62 of the opposite polarity (e.g., negative or −) also being axially aligned. As shown in FIGS. 3 and 5, battery cell interconnect system 10 is then used to interconnect the various electrodes of the plurality of battery cells as follows. A first half (e.g., 3) of the plurality (e.g., 6) of battery cells 100 have their first electrodes 64 placed between and clamped between contact surface 46,48 of the first terminal clamp 40 and the first termination end 14 to form a first electrical contact therebetween by tightening the nuts 52 disposed on threaded rods 28. Nuts 52 should be tightened to a torque sufficient to provide a low resistance electrical contact, which may vary with the size of the clamp 40, conductive interconnect 12, cell electrode size and materials and the like. In an exemplary embodiment, the torque applied was about 1.2 N-m. In an exemplary embodiment, the battery cell interconnect system 10 described produced a contact resistance of about 150 micro-ohms or less. A second half (e.g., 3) of the plurality of battery cells 100 have their second electrodes 62 clamped between the contact surface 46,48 of the second terminal clamp 40 and the second termination end 16 to form a second electrical contact therebetween. In this way, the first half of the battery cells are connects in series with the second half. For purposes of example, this mechanically and electrically interconnected group of cells may be referred to as battery module 110, although the plurality of battery cells 100 per module 110 for a given configuration may be different from the number illustrated. As may be seen in FIGS. 3 and 5, this arrangement leaves the respective unattached cell electrodes 64,62 available for another application of battery cell interconnection system 10, namely the interconnection of adjacent modules 110, as is illustrated in another exemplary embodiment in FIG. 6. Thus, another application of battery cell interconnection system 10 may similarly be used to interconnect a plurality of battery modules 110 to form a battery pack 120.

The battery cell interconnect system 10 may be easily scaled in size to accommodate the interconnection of fewer or more battery cells, battery cells of different sizes, different current carrying capacities and the like. The battery cell interconnect system 10 described herein may be used to interconnect LiPo battery cells to form battery modules and battery packs having high output and large capacity, such as are needed to provide secondary batteries to be used as the power source in EV and HEV applications.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A battery cell interconnect system, comprising:
   a conductive interconnect having a first termination end and second termination end, the first termination end offset from the second termination end and separated therefrom by an intermediate portion, a pair of spaced threaded rods disposed on each of the first termination end and the second termination end, and an insulating layer disposed on an outer surface of the conductive interconnect over the intermediate portion;
   a pair of V-shaped conductive terminal clamps, each terminal clamp having a pair of intersecting legs, each having a contact surface thereon, and a pair of spaced bores disposed at an intersection of the legs, each V-shaped terminal clamp operative for disposition on respective ones of the spaced rods through respective ones of the spaced bores; and
   a plurality of threaded nuts operative for disposition on each of the threaded rods, wherein the terminal clamps are operative for clamping a plurality of battery cell electrodes by pressing engagement of the contact surfaces against the outer surface of the conductive interconnect.

2. The interconnect system of claim 1, wherein the conductive interconnect has an s-shape.

3. The interconnect system of claim 1, wherein the conductive interconnect comprises aluminum or copper.

4. The interconnect system of claim 1, wherein the V-shaped terminal clamps comprise aluminum or copper.

5. The interconnect system of claim 1, wherein each of the V-shaped terminal clamps have a flat at an apex of the intersecting legs which encompasses the spaced bores.

6. The interconnect system of claim 1, wherein the conductive interconnect is substantially cylindrical.

7. The interconnect system of claim 1, wherein the first termination end and second termination end each have a flat, wherein the respective pairs of threaded rods are disposed on the flats and extend through the conductive interconnect.

8. The interconnect system of claim 1, wherein the offset separates the first termination end and the second termination end by an offset distance.

9. The interconnect system of claim 8, wherein the conductive interconnect has a length.

10. The interconnect system of claim 9, wherein the length is greater than the offset difference.

11. The interconnect system of claim 9, wherein a ratio of the length to the offset distance is greater than 2.

12. A battery cell interconnect system, comprising:
    a conductive interconnect having a first termination end and second termination end, the first termination end offset from the second termination end and separated therefrom by an intermediate portion, a first pair of spaced threaded rods disposed on the first termination end and a second pair of spaced threaded rods disposed on the second termination end, and an insulating layer disposed on an outer surface of the conductive interconnect over the intermediate portion;
    a first V-shaped conductive terminal clamp and a second V-shaped conductive terminal clamp, each of the terminal clamps having a pair of intersecting legs, each having a contact surface thereon, and a pair of spaced bores disposed at an intersection of the legs, the first terminal clamp disposed on the first pair of spaced rods at the first termination end through its spaced bore pair, and the second terminal clamp disposed on the second pair of spaced rods at the second termination end through its spaced bore pair;
    a plurality of threaded nuts, each disposed on one of the threaded rods, and
    a plurality of battery cells, each having a first conductive electrode, a second conductive electrode, and an electrode spacing between them, the battery cells in touching contact with the first electrodes substantially axially aligned with one another and the second electrodes substantially axially aligned with one another, a first half of the plurality of battery cells having their first electrodes clamped between the contact surface of the first terminal clamp and the first termination end to form a first electrical contact therebetween, and a second half of the plurality of battery cells having their second electrodes clamped between the contact surface of the second terminal clamp and the second termination end to form a second electrical contact therebetween.

13. The interconnect system of claim 12, wherein the conductive interconnect has an s-shape.

14. The interconnect system of claim 12, wherein the conductive interconnect comprises aluminum or copper.

15. The interconnect system of claim 12, wherein the V-shaped terminal clamps comprise aluminum or copper.

16. The interconnect system of claim 12, wherein each of the V-shaped terminal clamps have a flat at an apex of the intersecting legs which encompasses the spaced bores.

17. The interconnect system of claim 12, wherein the conductive interconnect is substantially cylindrical.

18. The interconnect system of claim 12, wherein the first termination end and second termination end each have a flat, wherein the respective pairs of threaded rods are disposed on the flats and extend through the conductive interconnect.

19. The interconnect system of claim 12, wherein the first conductive electrodes and the second conductive electrodes comprise thin, flexible metal tapes.

20. The interconnect system of claim 19, wherein the first conductive electrodes and the second conductive electrodes comprise aluminum or copper or a combination thereof.

* * * * *